(12) United States Patent
Vashistha

(10) Patent No.: US 10,643,165 B2
(45) Date of Patent: May 5, 2020

(54) SYSTEMS AND METHODS TO QUANTIFY RISK ASSOCIATED WITH SUPPLIERS OR GEOGRAPHIC LOCATIONS

(71) Applicant: Atul Vashistha, Napa, CA (US)

(72) Inventor: Atul Vashistha, Napa, CA (US)

(*) Notice: Subject to any disclaimer, the term of this patent is extended or adjusted under 35 U.S.C. 154(b) by 167 days.

(21) Appl. No.: 15/806,616

(22) Filed: Nov. 8, 2017

(65) Prior Publication Data

US 2018/0068244 A1    Mar. 8, 2018

Related U.S. Application Data

(63) Continuation of application No. 14/984,504, filed on Dec. 30, 2015, now abandoned.

(51) Int. Cl.
*G06Q 10/06* (2012.01)
*G06Q 10/08* (2012.01)

(52) U.S. Cl.
CPC ........ *G06Q 10/0635* (2013.01); *G06Q 10/08* (2013.01)

(58) Field of Classification Search
USPC ................................ 705/7.11–7.42
See application file for complete search history.

(56) References Cited

U.S. PATENT DOCUMENTS

| 2005/0021360 A1* | 1/2005 | Miller | G06Q 10/0635 |
| | | | 705/7.28 |
| 2005/0197952 A1* | 9/2005 | Shea | G06O 40/025 |
| | | | 705/38 |
| 2010/0198630 A1* | 8/2010 | Page | G06Q 10/0635 |
| | | | 705/7.28 |
| 2014/0108072 A1* | 4/2014 | McGowan | G06Q 10/06312 |
| | | | 705/7.11 |

OTHER PUBLICATIONS

Blackhurst, Jennifer, "Supplier risk assessment and monitoring for the automotive industry", International Journal of Physical Distribution & Logistics Management, vol. 38, No. 2, 2008, pp. 143-165. (Year: 2008).*

* cited by examiner

*Primary Examiner* — Amber A Misiaszek
(74) *Attorney, Agent, or Firm* — Kelley Drye & Warren LLP

(57) ABSTRACT

Computer-implemented systems and methods to quantify risk associated with suppliers or geographic locations at which suppliers or global internal delivery centers are located. The systems and methods transform risk parameter data into risk metrics that allow comparison of relative risk between suppliers, supplier sites, or geographic locations, and allow comparison of risk metrics to minimum risk scores calculated for a given metric. The systems and methods further provide guidance/proposed action to take based on the generated risk metrics.

15 Claims, 6 Drawing Sheets

Supplier ABC

| | Q2 2015 | | Q3 2015 | Best |
|---|---|---|---|---|
| Total Risk Score | 5.04 | | 5.08 | 4.67 |
| Financial Risk | 2.16 | ⬆ | 2.19 | 1.52 |
| Service Maturity Risk | 4.51 | ⬇ | 4.40 | 3.69 |
| Governance Risk | 5.46 | ⬆ | 6.02 | 3.59 |
| People Risk | 4.45 | — | 4.45 | 3.72 |
| Infrastructure Risk | 5.55 | ⬇ | 5.34 | 2.68 |
| Clients Risk | 5.36 | — | 5.36 | 3.89 |
| Partners/Alliances Risk | 6.68 | — | 6.68 | 4.27 |
| Thought Leadership Risk | 3.90 | ⬇ | 3.81 | 3.49 |

FIG. 3

Supplier Comparison

| | Supplier 1 | | | Supplier 2 | | | Supplier 3 | | | Best |
|---|---|---|---|---|---|---|---|---|---|---|
| | Q2 2015 | | Q3 2015 | Q2 2015 | | Q3 2015 | Q2 2015 | | Q3 2015 | |
| Total Risk Score | 5.33 | ← | 5.35 | 3.02 | ← | 3.19 | 3.82 | ← | 3.87 | 3.11 |
| Financial Risk | 5.8 | ← | 6.02 | 5.09 | ← | 5.53 | 5.49 | ← | 5.88 | 4.31 |
| Service Maturity Risk | 5.81 | — | 5.81 | 2.71 | ← | 3.1 | 2.43 | — | 2.43 | 2.28 |
| Governance Risk | 3.34 | — | 3.34 | 1.78 | — | 1.78 | 3 | — | 3 | 1.68 |
| People Risk | 9.44 | — | 9.44 | 4.6 | → | 4.05 | 5.47 | — | 5.47 | 3.56 |
| Infrastructure Risk | 2.95 | — | 2.95 | 1.65 | — | 1.65 | 1.59 | ← | 1.71 | 1.59 |
| Clients Risk | 2.33 | — | 2.33 | 2.8 | — | 2.8 | 4.11 | — | 4.11 | 1.83 |
| Partners/Alliances Risk | 3.83 | — | 3.83 | 1.4 | ← | 1.7 | 5 | ← | 5.25 | 1 |
| Thought Leadership Risk | 7 | → | 6.6 | 2 | — | 2 | 5.6 | → | 4.4 | 1 |

FIG. 4

Location XYZ

| | Q2 2015 | | Q3 2015 | Best |
|---|---|---|---|---|
| Total Risk Score | 5.08 | → | 5.04 | 4.37 |
| Macro-Economic Risk | 4.51 | → | 4.40 | 3.69 |
| Financial Risk | 2.16 | ← | 2.19 | 1.52 |
| Geo- Political Risk | 4.45 | — | 4.45 | 3.72 |
| Infrastructure Risk | 5.46 | ← | 6.02 | 3.59 |
| Business Risk | 6.68 | — | 6.68 | 4.27 |
| Legal Risk | 5.36 | → | 5.36 | 3.89 |
| Scalability Risk | 5.55 | → | 5.34 | 2.68 |
| Quality of Life Risk | 3.90 | → | 3.81 | 3.49 |

FIG. 5

Location Comparison

| | Location 1 | | | Location 2 | | | Location 3 | | | |
|---|---|---|---|---|---|---|---|---|---|---|
| | Q2 2015 | | Q3 2015 | Q2 2015 | | Q3 2015 | Q2 2015 | | Q3 2015 | Best |
| Total Risk Score | 5.77 | ➡ | 5.72 | 4.76 | ⬅ | 4.8 | 5.42 | ⬅ | 5.53 | 4.66 |
| Macro-Economic Risk | 3.87 | ➡ | 3.21 | 2.88 | ⬅ | 3.56 | 3.71 | ⬅ | 7.16 | 1.59 |
| Financial Risk | 6.91 | ⬅ | 6.99 | 5.53 | ⬅ | 5.62 | 5.36 | ⬅ | 5.41 | 3.77 |
| Geo-Political Risk | 4.91 | ➡ | 4.78 | 4.41 | ➡ | 4.39 | 5.8 | ➡ | 5.55 | 3.56 |
| Infrastructure Risk | 5.89 | — | 5.89 | 4.33 | — | 4.33 | 5.08 | ➡ | 4.82 | 3.72 |
| Business Risk | 5.04 | — | 5.04 | 4.28 | — | 4.28 | 5.04 | — | 5.04 | 2.68 |
| Legal Risk | 5.23 | — | 5.23 | 3.92 | — | 3.92 | 5.03 | — | 5.03 | 3.89 |
| Scalability Risk | 6.8 | — | 6.8 | 5.86 | ⬅ | 5.87 | 5.97 | — | 5.97 | 4.27 |
| Quality of Life Risk | 4.59 | ➡ | 4.54 | 3.98 | ➡ | 3.91 | 5.25 | ⬅ | 5.29 | 3.36 |

SYSTEMS AND METHODS TO QUANTIFY RISK ASSOCIATED WITH SUPPLIERS OR GEOGRAPHIC LOCATIONS

I. CROSS-REFERENCE TO RELATED APPLICATION

This application is a continuation of U.S. patent application Ser. No. 14/984,504, filed Dec. 30, 2015. The entire contents of that application are incorporated herein by reference.

II. BACKGROUND

The present invention is directed to computer-implemented systems and methods for transforming data into risk metrics to quantify the risk associated with a particular supplier or suppliers, or the potential risk associated with a geographic location at which a supplier or global internal delivery center is located.

Risk assessment and management is essential for success of a wide variety of endeavors, including individual and organizational activities. An organization may face risk in many forms, including client risks, competitor risks, supplier risks, legal risks, technological risks, political risks, and environmental risks. Properly identifying, understanding and evaluating risks can allow an organization to prepare for and respond to events beyond its control.

For example, a company that offers goods for sale may purchase component parts for its goods from one or more suppliers. When selecting a supplier, companies typically look to more than just price. For example, reliable and timely delivery of component parts and whether the supplier is a sustainable business are also key factors when selecting a supplier. Companies often depend on suppliers to timely supply raw materials or other inputs to ensure uninterrupted sales and distribution of goods and services. A disruption in the supply chain may reduce the capability of a company to provide its goods and services, thereby reducing its sales and revenue. A disruption in the supply chain may also cause the company to breach contracts it has entered to sell its goods and service to customers, thereby subjecting the company to legal liability. A disruption in supply can therefore have severe consequences for a company. Identifying risks in the supply chain, including particular risks associated with suppliers, is critical to the ongoing success of an organization.

A supplier may face disruptions in its business for reasons directly relating to the operations and business decisions of the supplier, or for reasons wholly beyond the supplier's control. For example, a supplier that does not invest in training and development for its work force may face a high attrition rate and a shortage of labor. As another example, a supplier may depend on supplies or services from a third-party supplier, such as electric service from a government utility company, to maintain its business operations. In a third example, a viable and successful company can face disruptions because of location-based events beyond its control such as natural disasters, geo-political events, or changes in laws. Any disruption in supply from the third-party supplier may cause disruptions further along the supply chain.

However, risks associated with suppliers have been difficult to quantify. Consequently, acquiring a comprehensive understanding of the risks face by companies can be challenging. In addition, processing and analyzing the data in a timely manner is critical to taking necessary actions in response to the data.

III. SUMMARY OF INVENTION

An object of the present invention is to provide a method for converting data from disparate sources into quantified risk metrics that can be used to assess the risk associated with purchasing goods or services from a particular supplier using analytics and algorithms to determine the impact of specific events/parameters on risks.

An object of the present invention is to provide a method for converting data from disparate source into quantified risk metrics that can be used to assess the risk associated with purchasing goods or services from a particular location.

Yet another object of the present invention is to provide guidance based on the risk metrics to help organizations choose a supplier or mitigate the risk associated with a supplier, or to take advantage of opportunities brought about by changes in a location's or supplier's risk profile.

A further object of the present invention is to provide a system whereby the calculation of risk metrics may be adjusted by altering the percentage weights assigned to a risk category or risk sub-category.

Another object of the present invention is to provide a best score as a basis of comparison for the calculated risk metrics.

Another object of the present invention is to provide guidance on actions or steps to take to mitigate specific risks as they occur. The guidance may be changed based on a change in the risk score.

IV. BRIEF DESCRIPTION OF THE DRAWINGS

For a fuller understanding of the invention, reference is had to the following description of the accompanying Figures. Like reference numbers are used to refer to like and corresponding elements of the various Figures.

FIG. 3 is a sample dashboard of risk scores for a supplier.

FIG. 4 is a sample dashboard of risk scores for multiple suppliers.

FIG. 5 is a sample dashboard of risk scores for a location.

FIG. 6 is a sample dashboard of risk scores for multiple locations.

V. DETAILED DESCRIPTION OF THE INVENTION

As described in detail hereinafter, the present invention is directed to a computer-based system and process for converting data into risk metrics to quantify the potential risk associated with a particular supplier or suppliers, or the potential risk associated with a geographic location at which a supplier is located.

The disclosed processes and functionalities can be implemented by suitable computer-executable instructions. The computer-executable instructions may be stored as software code components or modules on one or more computer readable media, such as non-volatile memories, volatile memories, DASD arrays, magnetic tapes, floppy diskettes, hard drives, optical storage devices, etc. or any other appropriate computer-readable medium or storage device.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. The system utilizes existing computer hardware capabilities, and electronic communications links, for example, to receive and process information.

The system may include a computer server having electronic access to a database containing files or tables. The server can be electronically coupled to a global computer network such as, for example, the Internet. The server may communicate with at least one user interface, which can include conventional computer input, output and display devices. The user interface is preferably a remote computer interface capable of connection to the server via a network. The system may also be implemented by other known methods of computer networking. The server preferably operates under control of computer software to carry out the inventive process steps described in greater detail hereinafter. The computer software preferably includes XML, XSL, HTML, VML and JavaScript capability to prepare and present information in an Internet web browser format.

A. Supplier Risk Metrics

Figure 1:
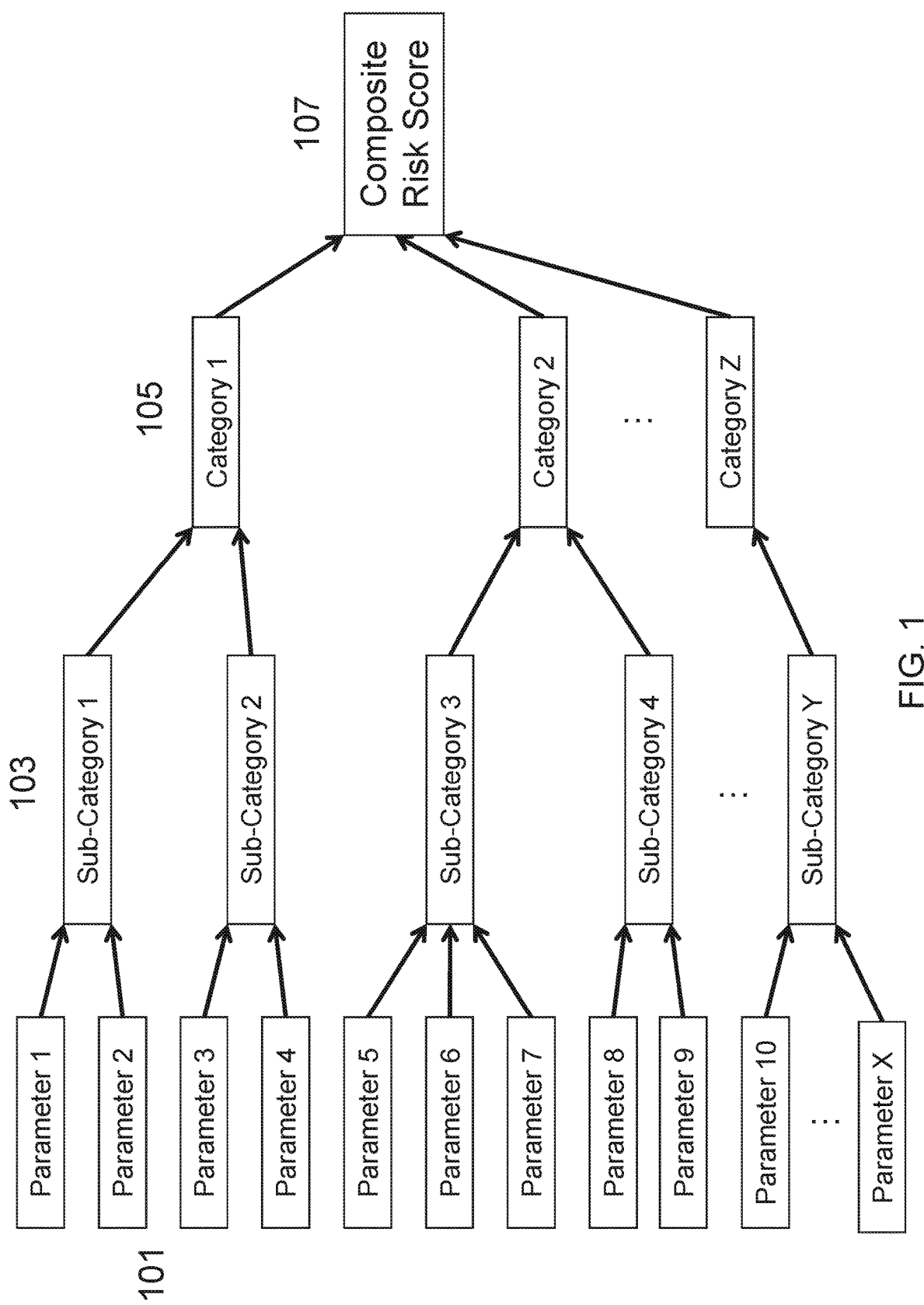
FIG. 1 is a chart showing the elements used in the transformation of data into risk categories and a composite risk score according to the present invention.

FIG. 1 depicts an exemplary hierarchy of elements used to generate a composite risk score (107) according to one embodiment of the present invention. As shown in FIG. 1, a composite risk score (107) may be generated from multiple risk categories (105). Each category (105) may be generated from multiple risk sub-categories (103). Each risk sub-category may be generated from parameters (101). In one embodiment, hundreds of parameters (101) may be used.

If the present invention is used to evaluate the risk associated with a particular supplier, exemplary risk categories (105) may include (1) "Financial Risk"; (2) "Service Maturity Risk"; (3) "Governance Risk"; (4) "People Risk"; (5) "Infrastructure Risk"; (6) "Client Risk"; (7) "Partner/Alliances Risk"; and (8) "Thought Leadership Risk."

Each risk category (105) may be associated with at least one risk sub-category (103). For example, the risk category (105) "Financial Risk" may be associated with risk sub-categories (103) directed to investment, ratios, balance sheet, liquidity, profitability, revenue, and revenue diversity metrics. The risk category (105) "Service Maturity Risk" may be associated with risk sub-categories (103) directed to key talent pool size, quality certifications, specialized certifications, operating model, service and vertical lines, and geographical metrics. The risk category (105) "Governance Risk" may be associated with risk sub-categories (103) directed to strength of corporate governance, changes in organizational structure, functional, and operating governance levels. The risk category (105) "People Risk" may be associated with risk sub-categories (103) directed to attrition, new hires, productivity, utilization, and employee development and training measures. The risk category (105) "Infrastructure Risk" may be associated with risk sub-categories (103) directed to physical security, information security, data theft/fraud, measures of delivery center networks, opening of new delivery centers and risks related to them, uptime policy/performance, and expansion plans. The risk category (105) "Client Risk" may be associated with risk sub-categories (103) directed to acquisition, retention/flight, concentration, and satisfaction. The risk category (105) "Partner/Alliances Risk" may be associated with risk sub-categories (103) directed to key partners and additions across enterprises, new alliances/partnerships during the relevant time period, and vertical and horizontal solutions. The risk category (105) "Thought Leadership Risk" may be associated with risk sub-categories (103) directed to innovation, published papers, event and topic leadership, patent information and key CSR metrics.

Each risk sub-category (103) may be associated with at least one parameter (101). For example, "People Risk" category (105) may be associated with an "attrition" sub-category (103) which may be associated with parameters (101) relating to attrition, such as the percentage of staff employees who departed the supplier during a particular time period, and the percentage of executives who departed the supplier during a particular time period.

Figure 2:
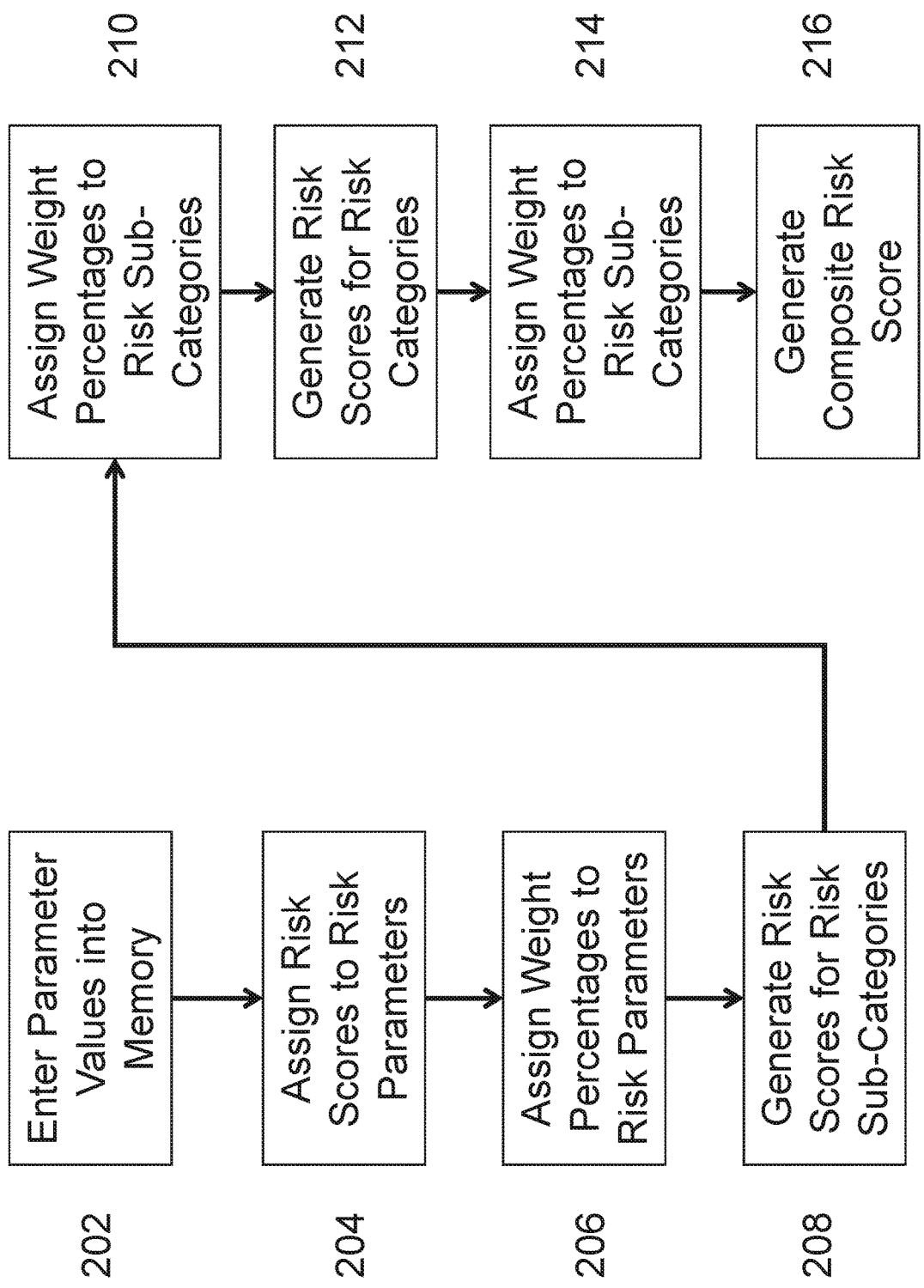
FIG. 2 is a flow chart depicting the disclosed process of transforming parameter values into risk categories and a composite risk score.

FIG. 2 is a flow chart depicting how a composite risk score (107) for a supplier may be generated from parameters (101), sub-categories (103), and categories (105). At Step 202, parameter values are entered into memory of a computer. A software application receives the parameter values and stores them in memory. When the parameter values are entered into memory, they are associated with one of the parameters (101).

A graphical user interface may be used to facilitate entry of the parameter values. The interface may have fields that allow entry of data. The software or interface may require entry of particular parameter values in a certain format or range. For example, certain numeric parameter values may be required as integers. A parameter (101) directed to the number of earthquakes experienced in a particular region may require an integer value. As another example, the interface may require a percentage value entered between zero per centum and one hundred per centum. If a parameter (101) is directed to the percentage of staff employees who departed a supplier during a particular time period, a parameter value entered for that parameter (101) would be entered as a percentage value between zero per centum and one hundred per centum. If a parameter (101) is directed to revenue earned by the supplier during a particular time period, a parameter value entered for that parameter (101) would be entered as a unit of currency. The graphical user interface may facilitate entry of parameter values by indicating the unit format for each parameter, or by requiring the parameter value to be entered in the required unit format before the parameter value is entered into memory.

At Step 204, a risk score is assigned to each parameter (101) based on the parameter value entered for the parameter (101). For each parameter (101), a series of bands or ranges are assigned. The parameter value entered for the parameter (101) would fall within one of the assigned bands. Each band may be correlated to a risk score for the parameter (101). The risk score assigned to a parameter (101) therefore depends on the band in which the parameter value lies. For example, for a parameter (101) directed to the number of typhoons experienced in a region, a band spanning the range of "one to three" may be correlated with a risk score of 2, a band spanning the range of "four to six" may be correlated with a risk score of 4, a band spanning the range of "seven to nine" may be correlated with a risk score of 7, and a band spanning the range "greater than nine" may be correlated with a risk score of 9. If the actual number of typhoons experienced in a region is five, then a risk score of 4 would be assigned to the parameter directed to the number of typhoons.

The risk score assigned to the bands may be a number chosen from a predetermined range such as one to ten. The number assigned to the risk parameter (101) reflects the relative level of risk reflected by the parameter value. For example, a risk score in the range of 1.0 to 2.0 may correspond to a negligible risk, a risk score in the range of 2.1 to 4.0 may correspond to a low risk, a risk score in the range of 4.1-6.0 may correspond to a moderate risk, a risk score in the range of 6.1 to 8.0 may correspond to a high risk, and a risk score in the range of 8.1 to 10.0 may correspond to an extreme risk.

For presentation purposes, a color may be associated with each risk score range. For example, the color dark green may be associated with the risk score range of 1.0 to 2.0, the color light green may be associated with the risk score range of 2.1 to 4.0, the color yellow may be associated with the risk score range of 4.1-6.0, the color light red may be associated with the risk score range of 6.1 to 8.0, and the color dark red may be associated with the risk score range of 8.1 to 10.0.

At Step 206, a weight percentage is assigned to each parameter (101). The weight percentages determine the importance of each risk parameter (101) in the assessment of risk for the supplier. For example, although a parameter value entered for a parameter (101) may be an extreme value for that parameter (101), the parameter (101) may not have a significant impact on the risk assessment of a supplier. The weight percentage assigned to that parameter (101) would therefore be a relatively low percentage. The sum of weight percentages assigned to all parameters (101) associated with a particular risk sub-category (103) may total 100 per centum. If no parameter values are entered for one or more parameters (101), the weight percentages assigned to the parameters (101) may be redistributed to the parameters (101) for which values have been entered. The redistribution of weight percentages may be done by evenly dividing the redistributed percentages among the parameters (101) for which values were entered, or according to the relative weights assigned to the parameters (101) for which values were entered.

At Step 208, a risk score is calculated for each risk sub-category (103) based on the values entered for the parameters (101) associated with the risk sub-category (103) and the weight percentages assigned to each parameter (101). For example, the software may calculate the risk score for each risk sub-category (103) by tallying the sum of the product of each risk score assigned to a parameter (101) and the weight percentage assigned to the parameter (101).

The risk score may be constrained to a number within a certain range such as one to ten. For example, a risk score in the range of 1.0 to 2.0 may correspond to a negligible risk, a risk score in the range of 2.1 to 4.0 may correspond to a low risk, a risk score in the range of 4.1-6.0 may correspond to a moderate risk, a risk score in the range of 6.1 to 8.0 may correspond to a high risk, and a risk score in the range of 8.1 to 10.0 may correspond to an extreme risk. A color may also be assigned to each risk sub-category (103). The color assigned to each risk sub-category (103) may follow the same or similar exemplary approach described above for the colors associated with parameters (101).

At Step 210, weight percentages are assigned to each risk sub-category (103). The weight percentages determine the importance of each sub-category (103) in the assessment of risk for the supplier. The sum of weight percentages assigned to all sub-categories (103) associated with a particular risk category (105) may total 100 per centum.

At Step 212, a risk score is calculated for each risk category (105) based on the risk scores of each sub-category (103) associated with the risk category (105) and the weight percentages assigned to each sub-category (103). For example, the software may calculate the risk score for each risk category (105) by tallying the sum of the product of each risk score assigned to a sub-category (103) and the weight percentage assigned to the sub-category (103).

The risk score may be constrained to a number within a certain range such as one to ten. For example, a risk score in the range of 1.0 to 2.0 may correspond to a negligible risk, a risk score in the range of 2.1 to 4.0 may correspond to a low risk, a risk score in the range of 4.1-6.0 may correspond to a moderate risk, a risk score in the range of 6.1 to 8.0 may correspond to a high risk, and a risk score in the range of 8.1 to 10.0 may correspond to an extreme risk. A color may also be assigned to each risk category (105). The color assigned to each risk category (105) may follow the same or similar exemplary approach described above for the colors associated with parameters (101).

At Step 214, weight percentages are assigned to each risk category (105). The weight percentages determine the importance of each category (105) in the assessment of risk for the supplier. The sum of weight percentages assigned to all categories (105) may total 100 per centum. Note that the weight percentages assigned to the risk parameters (101), the sub-categories (103) and the categories (105) do not necessarily need to be assigned in the order reflected in FIG. 2. The weight percentages assigned to the risk parameters (101) may be assigned at any time up until Step 208, the weight percentages assigned to the risk sub-categories (103) may be assigned at any time up until Step 212, and the weight percentages assigned to the risk categories (105) may be assigned at any time up until Step 216.

At Step 216, a composite risk score (107) is calculated for a supplier based on the risk scores of each category (105) and the weight percentages assigned to each category (105). For example, the software may calculate a composite risk score (107) by tallying the sum of the product of each risk score assigned to a category (105) and the weight percentage assigned to the category (105).

The risk score may be constrained to a number within a certain range such as one to ten. For example, a risk score in the range of 1.0 to 2.0 may correspond to a negligible risk, a risk score in the range of 2.1 to 4.0 may correspond to a low risk, a risk score in the range of 4.1-6.0 may correspond to a moderate risk, a risk score in the range of 6.1 to 8.0 may correspond to a high risk, and a risk score in the range of 8.1 to 10.0 may correspond to an extreme risk. A color may also be assigned to the composite risk score (107). The color assigned to the composite risk score (107) may follow the same or similar exemplary approach described above for the colors associated with parameters (101).

The above process may be performed for multiple suppliers. For each supplier, parameter values may be entered in memory and associated with parameters (101) at Step 202. Risk scores and weight percentages may be assigned to each parameter (101) at Steps 204 and 206, respectively. Risk scores may be generated for risk sub-categories (103) at Step 208 and weight percentages may be assigned to the risk sub-categories (103) at Step 210. Risk scores may be generated for risk categories (105) at Step 212 and weight percentages may be assigned to the risk categories (105) at Step 214. A composite score for each supplier may be generated at Step 216. However, each step need not be performed at the same time for each supplier.

B. Location Risk Metrics

The above examples are directed to transforming data into graphical and quantitative risk evaluation metrics reflecting the potential risk associated with a supplier or suppliers. The present invention may also be used to transform data into graphical and quantitative risk evaluation metrics reflecting the potential risk associated with a geographic location at which one or more suppliers are located. The geographic location may be, for example, a city or a country.

The process for evaluating risk associated with a geographic location is similar to the process for risk associated with a supplier. The steps and elements disclosed in FIGS. 1 and 2 would be the same for evaluating risk associated with a location, but the particular risk parameters (101), risk sub-categories (103), and risk categories (105) would be directed to parameters and categories more relevant to analysis of a location. Exemplary risk categories (105) may include (1) "Macro-Economic Risk"; (2) "Financial Risk"; (3) "Geo-Political Risk"; (4) "Infrastructure Risk"; (5) "Business Risk"; (6) "Legal Risk"; (7) "Scalability Risk"; and (8) "Quality of Life Risk."

Each risk category (105) may be associated with at least one risk sub-category (103). For example, the risk category (105) "Macro-Economic Risk" may be associated with risk sub-categories (103) directed to inflation, foreign direct investment, credit risk, currency risk, and market fluctuations. The risk category (105) "Financial Risk" may be associated with risk sub-categories (103) directed to labor cost metrics for each of information technology outsourcing (ITO), business process outsourcing (BPO), knowledge process outsourcing (KPO), as well as operational costs, and taxation factors. The risk category (105) "Geo-Political Risk" may be associated with risk sub-categories (103) directed to political risk and stability, social and security risk (e.g. terrorism, prevalence of travel advisory/warnings), and natural disaster risks. The risk category (105) "Infrastructure Risk" may be associated with risk sub-categories (103) directed to government support and incentives to source, power and utilities, transport and facilities, technological readiness, and quality of connectivity metrics. The risk category (105) "Business Risk" may be associated with risk sub-categories (103) directed to ease of doing business, regulatory and statutory requirements, business sophistication, and trade and logistics. The risk category (105) "Legal Risk" may be associated with risk sub-categories (103) directed to legal and regulatory policy and acts, cybercrime, ITO and BPO industry trade union activity, and key in-market labor and workday laws. The risk category (105) "Scalability Risk" may be associated with risk sub-categories (103) directed to size and growth characteristics for ITO and BPO, provider and process maturity, worker population spreads, attrition/hiring measures, and languages. The risk category (105) "Quality of Life Risk" may be associated with risk sub-categories (103) directed to e.g. expat quality of life measures and business support and amenities.

Each risk sub-category (103) may be associated with at least one parameter (101). For example, "Financial Risk" category (105) may be associated with an "operational cost" sub-category (103) which may be associated with parameters (101) relating to rental growth, fuel prices and the cost of registering property.

C. Supplier Site Risk Metrics

A supplier may have more than one geographic location from which it supplies customers. For example, a supplier may provide components to its customers from sites in India and China. The present invention may be used to compare risks associated with each of a supplier's locations.

The exemplary hierarchy of elements and processing steps depicted in FIGS. 1 and 2 may be used to generate a composite risk score (107) for each supplier site. A composite risk score (107) may be generated from multiple risk categories (105). Each risk category (105) may be generated from multiple risk sub-categories (103). Each risk sub-category may be generated from parameters (101). The parameters (101), risk sub-categories (103) and risk categories (105) may concern the supplier, each supplier site, or the geographic location of each site.

D. Reporting Generated Risk Metrics

The parameter values and risk scores assigned to or generated for parameters (101), risk sub-categories (103), risk categories (105), and the composite risk score (107) may be presented by a number of means and in a number of formats. For example, the risk scores may be presented as numerical values which may be arranged in a table. The risk scores may also be presented as graphed data points, bar charts, pie graphs, or any other graphical representation. The risk scores from more than one time period may be presented concurrently.

FIG. 3 depicts a sample table of risk scores for a supplier for the second and third quarters of the year 2015 ("Q2 2015" and "Q3 2015," respectively). Risk scores for each quarter are presented in separate columns. For each quarter, the table includes risk scores generated for eight risk categories and a composite risk score (i.e. "Total Risk Score") for the supplier. Between each column may be symbols indicating whether the risk score for a category increased, decreased, or remained the same from one time period to the next. For example, an arrow pointing up may be used to indicate that the risk score for a category increased between quarters, an arrow pointing down may be used to indicate that the risk score for a category decreased between quarters, and a horizontal line may be used to indicate that the risk score for a category did not change between quarters.

The table also includes a best composite risk score among all evaluated suppliers, and a best risk score among all evaluated suppliers for each risk category. The best composite risk score may be presented for one of the presented time periods. For example, in FIG. 3, the best composite risk score may correspond to Q3 2015. The best composite risk score may also be presented for a range of time periods or for all of the time periods for which data has been collected.

Risk scores for more than one supplier may be presented concurrently. FIG. 4 depicts a sample table of risk scores for multiple suppliers. For each supplier, risk scores for the second and third quarters of the year 2015 ("Q2 2015" and "Q3 2015," respectively) are presented in separate columns. Between each column are symbols indicating whether the risk score for a category increased, decreased, or remained the same from one quarter to the next.

Risk scores for locations may be presented. The locations may be a country, a city, or another region or geographic location. FIG. 5 depicts a sample table of risk scores for a location for the second and third quarters of the year 2015 ("Q2 2015" and "Q3 2015," respectively). For each quarter, the table includes risk scores generated for eight risk categories and a composite risk score (i.e. "Total Risk Score") for the location. Between each column are symbols indicating whether the risk score for a category increased, decreased, or remained the same from one time period to the next.

The table also includes a best composite risk score among all evaluated locations, and a best risk score among all evaluated locations for each risk category. The best composite risk score may be presented for one of the presented time periods. For example, in FIG. 5, the best composite risk score may correspond to Q3 2015. The best composite risk score may also be presented for a range of time periods or for all of the time periods for which data has been collected.

Risk scores for more than one supplier may be presented concurrently. FIG. 6 depicts a sample table of risk scores for multiple locations. For each location, risk scores for the second and third quarters of the year 2015 ("Q2 2015" and "Q3 2015," respectively) are presented in separate columns. Between each column are symbols indicating whether the risk score for a category increased, decreased, or remained the same from one quarter to the next.

Colors associated with each risk score may be reflected in the presentation of the scores. In FIG. 3, the Total Risk Score for the second quarter of 2015 is 5.04. If, for example, the color yellow is associated with the risk score range of 4.1-6.0, the background color of the table cell containing the Total Risk Score for the second quarter of 2015 may be displayed as yellow. In the alternative, the font color of the risk score may correspond to the color associated with the risk score, or color associated with the range of risk scores in which the risk score falls. Color may also be applied to the Best scores, shown for example in the right-most column of the table depicted in FIG. 3.

The risk scores may be presented in a hard copy report. The risk scores may also be presented in electronic form, such as data on an Internet web page or as a .csv file. If the risk scores are presented on an Internet web page, a user accessing the web page from a remote computer may request the elements underlying each of the risk scores presented. For example, a user viewing the table depicted in FIG. 3 may request further detail concerning the "Governance Risk" category risk score for the third quarter of 2015. The user would then be presented the risk sub-categories associated with the "Governance Risk" category and the risk scores generated for each sub-category. Similarly if a user requested further detail concerning a sub-category, the user would be presented the parameters associated with the sub-category and the risk scores assigned to each parameter.

A user may also be allowed to customize the process for generating risk scores. For example, as shown in FIG. 2, the risk scores generated (208) for risk sub-categories are based in part on the weight percentages assigned (206) to the risk parameters. Also, the risk scores generated (212) for risk categories are based in part on the weight percentages assigned (210) to sub-categories. The composite risk scores are also generated (216) based in part on weight percentages assigned (214) to the risk categories. In one embodiment of the present invention, the system used to generate the risk scores may receive from a user of the system a request to change the weight percentages assigned to risk parameters, risk sub-categories, or risk categories. The system may then generate new risk scores for risk sub-categories or risk categories, or generate a new composite risk score based on the received weight percentages.

Guidance or proposed action steps may also be presented to suggest how to address or mitigate risk associated with a supplier or a location. Guidance may also be given on a broader, long-term basis for all risk categories. The guidance may also be given in response to specific risk trigger events such as natural disasters like earthquakes and tropical storms or on financial events like a quarterly financial report by a supplier.

For example, depending on the risk scores generated for a particular location, companies working with supplier in that location may be advised to review their supplier's disaster recovery and business continuity plans and programs, and ensure the supplier is equipped with emergency measures to deal with any hazard situation. Companies using multinational suppliers may be advised to include clauses in their contract with the supplier that would allow moving work from one country to another based on situations like increasing security concerns and natural disasters.

The guidance to be presented may be determined based on a particular risk score or based on a band of risk scores. For example, certain guidance may be presented if a risk score is above a specific value, while different guidance may be presented if a risk score is below a specific value. Certain guidance may be presented if a risk score falls within a particular band or range. The guidance presented may be based on whether a risk score changes from one band to another, or depending on which risk score or scores change the most between time periods. The guidance presented may be based on the weight percentage assigned to one or more risk parameters (101), risk subcategories (103), or risk categories (105). The guidance presented may be based on the change in value of a parameter (101) risk score, a sub-category (103) risk score, or a category (105) risk score that causes the greatest changes in the composite risk score.

The system of the present invention may issue an alert based on data input into the system relevant to one or more parameters (101). For example, if a natural disaster strikes a location, the system may issue a report describing the natural disaster. The report may further include guidance or proposed action steps to taken in response to the natural disaster.

Other modifications to and variations of the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention, as defined in the appended claims.

What is claimed is:

1. A computer-implemented method for automatically converting parameter values into risk evaluation metrics and providing guidance based on the metrics, the method comprising:

generating a number of database fields for receiving risk parameter data wherein the number of database fields for receiving risk parameter data is greater than 1;

generating a number of database fields for receiving risk sub-category values wherein the number of database fields for receiving risk sub-category values is greater than 1, and wherein each database field for receiving risk parameter data is associated with a database field for receiving a risk subcategory value;

generating a number of database fields for receiving risk category values wherein the number of database fields for receiving risk category values is greater than 1, and wherein each database field for receiving risk sub-category values is associated with a database field for receiving a risk category value;

automatically entering risk parameter data into database fields of a graphical user interface, wherein the risk parameter data corresponds to a number of suppliers, wherein the number of suppliers is greater than 1, and wherein at least one database field requires entry of data in a specific format or range;

automatically determining a parameter risk score based on the data entered into a database field for receiving risk parameter data, wherein the parameter risk score is a predetermined number corresponding to the data;

automatically assigning a weight percentage to each database field for receiving risk parameter data wherein the weight percentage is chosen from a first set of weight percentages; for each supplier, entering a sub-category risk score into a database field for receiving a risk sub-category value based on at least one parameter risk score and the weight percentages assigned to each database field for receiving risk parameter data;

assigning to each database field for receiving a risk sub-category value a weight percentage chosen from a second set of weight percentages;

for each supplier, entering a category risk score into each database field for receiving risk category values based on at least one sub-category risk score and the weight percentages assigned to each database field for receiving risk sub-category values;

assigning to each database field for receiving a risk category value a weight percentage chosen from a third set of weight percentages;

automatically generating and storing a first composite risk score for a supplier based on at least one category risk score and the weight percentages assigned to each database field for receiving a risk category value corresponding to that supplier;

for one supplier, presenting to a display screen the first composite risk score, the entered category risk scores for that supplier, and a recommendation based on the category risk score entered into a database field for receiving risk category values;

presenting to the display screen the lowest category risk score among all category risk scores entered into database field for receiving risk category values for all suppliers;

assigning a color to each category risk score, wherein said color is selected from a pre-selected set of colors, and wherein each pre-selected color is associated with a risk score;

for each category risk score, presenting to the display screen the color assigned to the category risk score; and automatically issuing and transmitting to the display screen an alert based on data entered into one or more database fields for receiving risk parameter data.

2. The method of claim 1 further comprising receiving a fourth set of weight percentages; and generating a second composite risk score for the supplier based on a category risk score and the weight percentage assigned to each database field for receiving a risk category value from the fourth set of weight percentages.

3. The method of claim 1 wherein the alert includes guidance based on data entered into one or more database fields.

4. The method of claim 1 wherein said database fields for receiving risk category values correspond to categories selected from the categories of financial risk; solutions maturity risk; people risk; client risk; governance, regulatory and compliance risk; and cybersecurity risk.

5. A computer-implemented method for converting parameter values into risk evaluation metrics and providing guidance based on the metrics, the method comprising:

generating a number of database fields for receiving risk parameter data wherein the number of database fields for receiving risk parameter data is greater than 1;

generating a number of database fields for receiving risk sub-category values wherein the number of database fields for receiving risk sub-category values is greater than 1, and wherein each database field for receiving risk parameter data is associated with a database field for receiving a risk subcategory value;

generating a number of database fields for receiving risk category values wherein the number of database fields for receiving risk category values is greater than 1, and wherein each database field for receiving risk sub-category values is associated with a database field for receiving a risk category value;

automatically entering risk parameter data into database fields of a graphical user interface, wherein the risk parameter data corresponds to a number of sites of a supplier, wherein the number of sites is greater than 1, and wherein at least one database field requires entry of data in a specific format or range;

automatically determining a parameter risk score based on the data entered into a database field for receiving risk parameter data, wherein the parameter risk score is a predetermined number corresponding to the data;

assigning a weight percentage to each database field for receiving risk parameter data wherein the weight percentage is chosen from a first set of weight percentages;

for each supplier site, entering a sub-category risk score into a database field for receiving a risk sub-category value based on at least one parameter risk score and the weight percentages assigned to each database field for receiving risk parameter data;

assigning to each database field for receiving a risk sub-category value a weight percentage chosen from a second set of weight percentages;

for each supplier site, entering a category risk score into each database field for receiving risk category values based on at least one sub-category risk score and the weight percentages assigned to each database field for receiving risk sub-category values;

assigning to each database field for receiving a risk category value a weight percentage chosen from a third set of weight percentages;

automatically generating a first composite risk score for a supplier site based on at least one category risk score and the weight percentages assigned to each database field for receiving a risk category value corresponding to that supplier;

for one supplier site, automatically transmitting and presenting to a display screen the first composite risk score, the entered category risk scores for that site, and a recommendation based on the category risk score entered into a database field for receiving risk category values;

presenting to the display screen the lowest category risk score among all category risk scores entered into database field for receiving risk category values for all supplier sites;

assigning a color to each category risk score, wherein said color is selected from a pre-selected set of colors, and wherein each pre-selected color is associated with a risk score;

for each category risk score, presenting to the display screen the color assigned to the category risk score; and automatically issuing and transmitting to the display screen an alert based on data entered into one or more database fields for receiving risk parameter data.

6. The method of claim 5 further comprising receiving a fourth set of weight percentages; and generating a second composite risk score for each supplier site based on a category risk score and the weight percentage assigned to each database field for receiving a risk category value from the fourth set of weight percentages.

7. The method of claim 5 wherein the alert includes guidance based on data entered into one or more database fields.

8. The method of claim 5 wherein said database fields for receiving risk category values correspond to categories selected from the categories of: financial risk; solutions maturity risk; client risk; people risk; governance, regulatory and compliance risk; and cybersecurity risk.

9. A non-transitory computer readable storage medium on which is embedded one or more computer programs, said one or more computer programs implementing a method for automatically converting parameter values into risk evaluation metrics and providing guidance based on the metrics, said one or more computer programs comprising a set of instructions for:
   storing a number of risk parameters wherein the number of risk parameters is greater than 1;
   associating each risk parameter with a risk sub-category;
   associating each risk sub-category with a risk category;
   automatically receiving parameter values into memory of a first device, said parameter values corresponding to risk parameters for a number of suppliers wherein the number of suppliers is greater than 1;
   automatically assigning a risk score to each risk parameter based on the parameter value entered for the risk parameter, wherein each risk score is a predetermined number corresponding to the parameter value;
   assigning to each risk parameter a weight percentage from a first set of weight percentages;
   for each supplier, automatically generating a risk score for each risk sub-category based on the risk score and weight percentage assigned to each risk parameter associated with the risk sub-category;
   assigning to each risk sub-category a weight percentage from a second set of weight percentages;
   for each supplier, generating a risk score for each risk category based on the risk score and weight percentage assigned to each risk sub-category associated with the risk category;
   assigning to each risk category a weight percentage from a third set of weight percentages;
   generating a first composite risk score for a supplier based on the risk score and weight percentage assigned to each risk category corresponding to that supplier;
   for one supplier, presenting and transmitting to a display screen the composite risk score, the risk score of each risk category for that supplier, and a recommendation based on the risk score of one risk category;
   presenting to the display screen the risk score reflecting the lowest risk calculated for each risk category among all of the suppliers;
   assigning a color to each category risk score, wherein said color is selected from a pre-selected set of colors, and wherein each pre-selected color is associated with a risk score;
   for each category risk score, presenting to the display screen the color assigned to the category risk score; and
   automatically issuing to the display screen an alert based on data entered into one or more database fields for receiving risk parameter data.

10. The non-transitory computer readable storage medium according to claim 9, said one or more computer programs further comprising a set of instructions for receiving a fourth set of weight percentages; and generating a second composite risk score for the supplier based on the risk score assigned to each risk category and the weight percentage assigned to each risk category from the fourth set of weight percentages.

11. The non-transitory computer readable storage medium according to claim 9, wherein the alert includes guidance based on data entered into one or more database fields.

12. The non-transitory computer readable storage medium according to claim 9, wherein said risk categories are selected from the categories of: financial risk; solutions maturity risk; people risk; client risk; governance, regulatory and compliance risk; and cybersecurity risk.

13. The method of claim 1 further comprising redistributing the weight percentages assigned to the database field for receiving risk parameter data if no risk parameter data is entered into one or more database field of the graphical user interface for receiving risk parameter data.

14. The method of claim 5 further comprising redistributing the weight percentages assigned to the database field for receiving risk parameter data if no risk parameter data is entered into one or more database field of the graphical user interface for receiving risk parameter data.

15. The method of claim 9 further comprising redistributing the weight percentages assigned to the risk parameters if no parameter value is received for one or more risk parameters.

* * * * *